United States Patent
Fraiss et al.

(10) Patent No.: US 10,486,478 B2
(45) Date of Patent: Nov. 26, 2019

(54) METHOD FOR MONITORING VEHICLE TIRES WITH A TIRE PRESSURE CONTROL SYSTEM

(71) Applicant: Continental Reifen Deutschland GmbH, Hannover (DE)

(72) Inventors: Karim Fraiss, Hannover (DE); Terrance Smouter, Indian Land, SC (US); Jerry Wayne Pennell, Jr., Rock Hill, SC (US); Andreas Scher, Burgdorf (DE); Timo Dieringer, Hannover (DE)

(73) Assignee: Continental Reifen Deutschland GmbH, Hannover (DE)

( * ) Notice: Subject to any disclaimer, the term of this patent is extended or adjusted under 35 U.S.C. 154(b) by 0 days.

(21) Appl. No.: 16/315,945

(22) PCT Filed: May 11, 2017

(86) PCT No.: PCT/EP2017/061245
§ 371 (c)(1),
(2) Date: Jan. 7, 2019

(87) PCT Pub. No.: WO2018/007056
PCT Pub. Date: Jan. 11, 2018

(65) Prior Publication Data
US 2019/0329608 A1   Oct. 31, 2019

(30) Foreign Application Priority Data
Jul. 8, 2016   (DE) ........................ 10 2016 212 526

(51) Int. Cl.
*B60C 23/04*   (2006.01)
*B64C 39/02*   (2006.01)

(52) U.S. Cl.
CPC ........ *B60C 23/0479* (2013.01); *B64C 39/024* (2013.01); *B64C 2201/122* (2013.01)

(58) Field of Classification Search
None
See application file for complete search history.

(56) References Cited

U.S. PATENT DOCUMENTS

| 9,539,866 | B2 | 1/2017 | Mouchet |
| 10,207,820 | B2 * | 2/2019 | Sullivan .................... B64F 1/22 |

(Continued)

FOREIGN PATENT DOCUMENTS

| DE | 10243441 A1 | 4/2004 |
| EP | 2727751 A1 | 5/2014 |

OTHER PUBLICATIONS

International Search Report dated Jul. 19, 2017 of international application PCT/EP2017/061245 on which this application is based.

*Primary Examiner* — Fekadeselassie Girma

(57) ABSTRACT

A method monitors the tire pressure of a multiplicity of parked vehicles or vehicle trailers. The method has the following steps: making available a drone with a receiver unit for acquiring radio-based tire data from a tire pressure control system, wherein the drone is stationed at a base station; lifting off of the drone from the base station and flying along a predefined flight route, wherein the drone flies along a flight route above the vehicles or the vehicle trailers, wherein, while flying along the flight route, the drone takes into account the transmitter range of the respective tire pressure control systems; receiving tire data from one tire pressure control system or a multiplicity of tire pressure control systems with the receiver unit of the drone; flying the drone back to the base station; and, evaluating the received tire data with a central receiver and control unit.

9 Claims, 2 Drawing Sheets

(56) References Cited

U.S. PATENT DOCUMENTS

| | | |
|---|---|---|
| 2002/0130771 A1* | 9/2002 | Osborne ............... B60C 23/005 |
| | | 340/438 |
| 2004/0094251 A1 | 5/2004 | Strache et al. |
| 2007/0018804 A1 | 1/2007 | Strache et al. |
| 2016/0016663 A1* | 1/2016 | Stanek .................... B60R 16/02 |
| | | 701/3 |
| 2017/0120700 A1 | 5/2017 | Mouchet |
| 2017/0253330 A1* | 9/2017 | Saigh .................... B64C 39/024 |
| 2018/0194176 A1* | 7/2018 | Bout .................. B60C 23/0461 |
| 2019/0261152 A1* | 8/2019 | Weinfield .............. B64C 39/024 |

* cited by examiner

METHOD FOR MONITORING VEHICLE TIRES WITH A TIRE PRESSURE CONTROL SYSTEM

CROSS REFERENCE TO RELATED APPLICATIONS

This application is the national stage of PCT/EP2017/061245, filed May 11, 2017, designating the United States and claiming priority from German patent application no. 10 2016 212 526.5, filed Jul. 8, 2016, the entire contents of which are incorporated herein by reference.

FIELD OF THE INVENTION

The invention relates to a method for monitoring vehicle tires with a tire pressure control system.

BACKGROUND OF THE INVENTION

Tire modules which are provided with transponders are used for various tasks in the tire, in particular in tire sensors for truck tires. This includes, in particular, a tire identification with which a motor vehicle manufacturer can inter alia detect quickly and in an automated manner which tire manufacturing plant has supplied a specific tire, and on which vehicle the tire has been mounted. Other tasks are generally monitoring of the air pressure, measuring the temperature or measuring mechanical stress states in the tire. Modern transponders are composed of an electronic component or electronic chip in which sensor elements can be arranged, and of an antenna which is connected to this electronic component. US 2004/0094251 and US 2007/0018804 discloses an example of such a transponder.

Fleet operators which have a multiplicity of vehicles or vehicle trailers standing in a parking area generally check the tire pressure of the individual vehicle tires manually at regular intervals with an air pressure measuring device. This checking entails, inter alia, a large expenditure of time.

SUMMARY OF THE INVENTION

It is an object of the invention to provide a method with which the tire pressure of a multiplicity of parked vehicles or vehicle trailers can be monitored easily.

The object is achieved by means of a method having the following steps:

a) making available a drone with a receiver unit for acquiring radio-based tire data from a tire pressure control system, wherein the drone is stationed at a base station, b) lifting off of the drone from the base station and flying along a predefined flight route, wherein the drone flies along a flight route above the vehicles or the vehicle trailers, wherein, while flying along the flight route, the drone takes into account the transmitter range of the respective tire pressure control systems, c) receiving tire data from one tire pressure control system or a multiplicity of tire pressure control systems with the receiver unit of the drone, d) flying the drone back to the base station, e) evaluating the received tire data with a central control unit, wherein, when a predefined tire pressure value is undershot in one of the received tire data items, a warning signal is activated, f) displaying the warning signal with the central control unit for a fleet operator, wherein an identification specification of the vehicle with the low tire pressure is issued with the warning signal.

An advantage of the invention in particular can be considered the fact that the method according to the invention significantly simplifies the checking of the tire pressure of individual vehicle tires. The drone with the receiver unit, which can also be remote-controlled, flies in an automated fashion along a specific flight route over the vehicles or the vehicle trailers. As the drone flies along the flight route, it collects radio-based tire data from the respective tire pressure control systems. Subsequently, automated evaluation of the tire data takes place, wherein a warning signal is displayed if, for example, a low pressure is detected at one of the vehicle tires. An employee of the fleet can subsequently go directly to the vehicle or to the vehicle trailer at which a low pressure has been detected at one of the vehicles. The expenditure on maintenance for checking the tire pressure of individual vehicle tires in a parking area of a fleet is as a result significantly reduced.

In one advantageous embodiment of the invention there is provision that in step f) the central control unit issues a position specification for the vehicle with the low tire pressure with the warning signal.

As a result, the central receiver and control unit indicates directly where the vehicle is located in the parking area.

In one advantageous embodiment of the invention there is provision that the fault diagnosis can relate to a low tire pressure at a vehicle tire, a low battery status or a loose tire module in the vehicle tire.

A loose tire module could lead to damage to the inside of the tire, for which reason a corresponding warning message should be issued.

In a further advantageous embodiment of the invention there is provision that in step f) the central control unit issues a position specification for the vehicle tire with the low pressure on the truck trailer with the warning signal.

As a result it is indicated, for example, whether the vehicle tire with the low pressure is located on the front axle or the rear axle. It is also specified whether the corresponding tire is located on the left or right side of the trailer.

In a further advantageous embodiment of the invention there is provision that the trailers are truck trailers, and the truck trailers are located in a parking area for a truck trailer fleet.

The expenditure on maintenance for truck trailers is particularly high, since they generally have a multiplicity of vehicle tires.

In a further advantageous embodiment of the invention there is provision that in step b) the flight route is made to extend above the truck trailers in a serpentine line.

This ensures that the receiver unit of the drone can reliably acquire the radio-based tire data from all the vehicle tires.

In a further advantageous embodiment of the invention there is provision that in step b), when flying along the flight route, the drone remains stationary in the air at individual positions for at least 10 seconds, preferably 10 seconds to 3 minutes, in order to be able to reliably receive the tire data from the individual tire pressure control systems.

The tire pressure control systems on the individual tires are generally set in such a way that they transmit a signal with tire data at predefined time intervals when the vehicle or the vehicle trailer is not moving. If the drone remains stationary in a position in the air for the above-mentioned time periods on its flight route, it can be ensured that the receiver unit receives a signal at least once from all the vehicle tires.

In a further advantageous embodiment of invention there is provision that the tire pressure control system comprises a tire module which is arranged in the tire cavity on the inside of the tire.

The tire modules can as a result acquire further important tire data directly at the vehicle tire, such as, for example, the temperature in the tire cavity.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
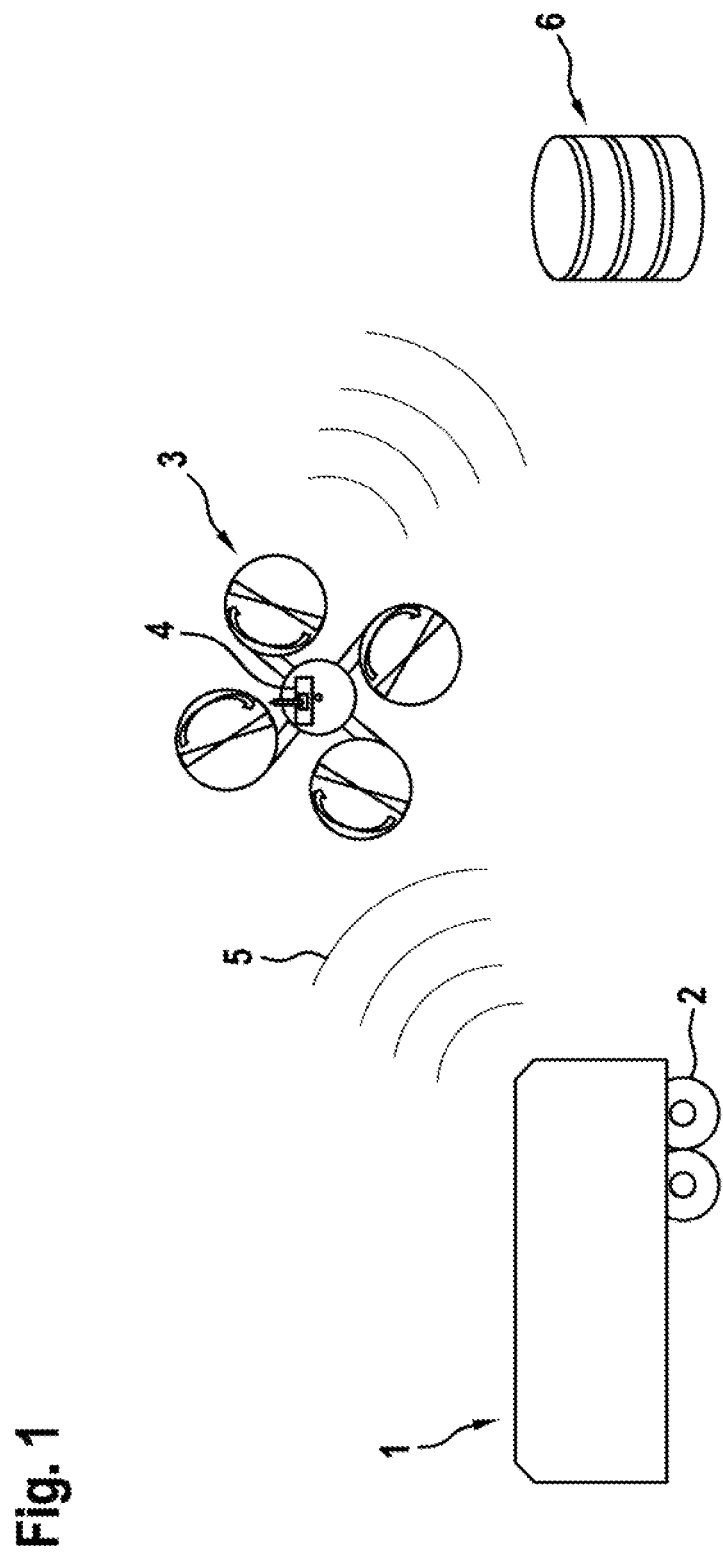
FIG. 1 shows a truck trailer, a drone and a central receiver and control unit; and, FIG. 2 shows a plan view of a parking area of a fleet for truck trailers.

FIG. 1 shows a schematic view of a truck trailer 1 with a multiplicity of vehicle tires 2 which are each equipped with a tire pressure control system. The drone 3 is equipped with a receiver unit 4. The receiver unit 4 receives the radio-based tire data 5 from the individual vehicle tires 2. The evaluation of the tire data takes place with a central receiver and control unit 6. The evaluation of the data can take place, for example, when the drone has returned to the base station. The drone and the central receiver and control unit 6 are also connected to one another via a radio link.

Figure 2:
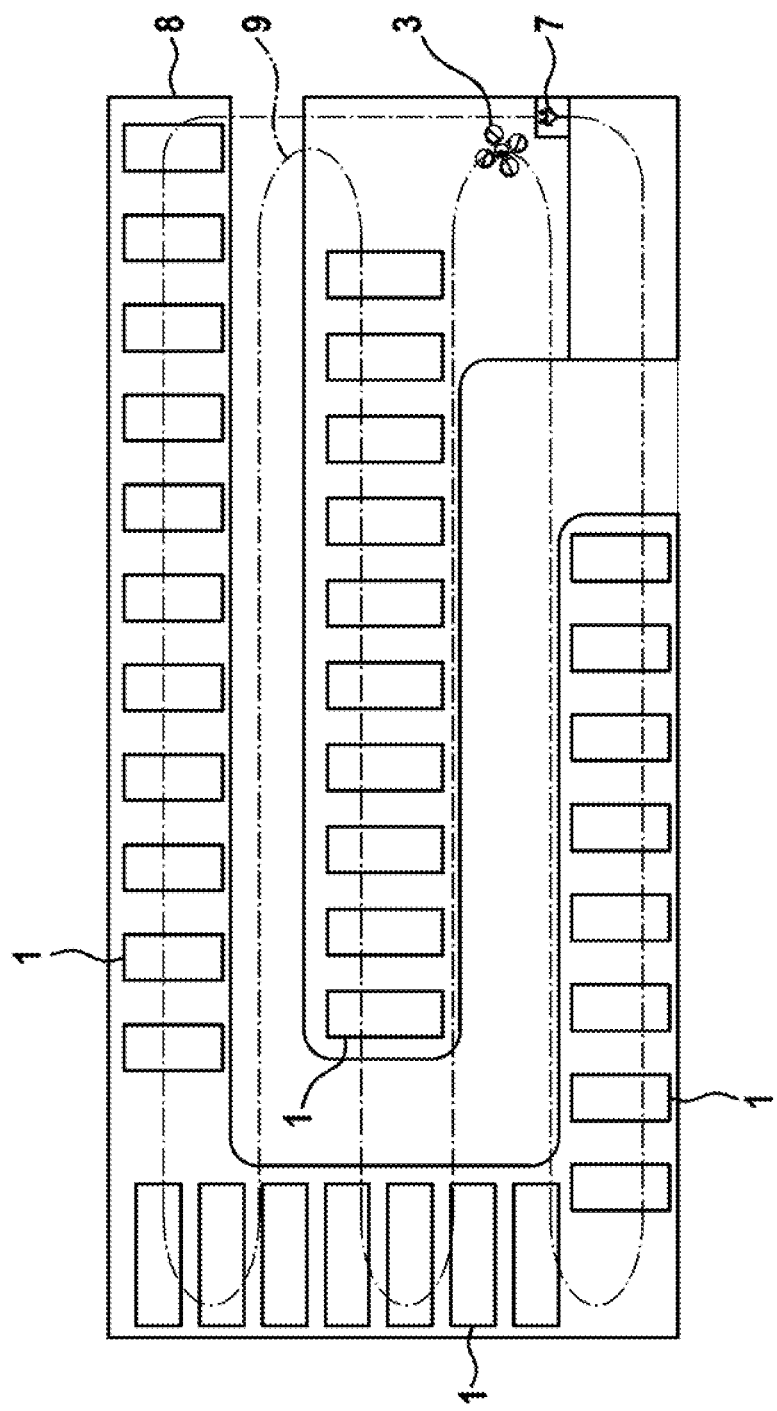

FIG. 2 shows a plan view of a parking area 8 of a fleet for a multiplicity of vehicle trailers 1. The drone 3 with the receiver unit is initially located in the base station 7. The drone 3 flies along the serpentine-line-shaped flight route 9 at regular intervals and subsequently returns to the base station 7. The flight route 9 is selected such that all the truck trailers 1 are flown over at least once. All the vehicle tires or at least a large part of the vehicle tires on the truck trailers 1 are equipped with a tire pressure control system. The tire pressure control systems transmit the tire data, which comprise inter alia specifications of the tire pressure, to the receiver unit of the drone 3. After the return of the drone 3 to the base station 7 or directly during a data link, existing in the flight mode, via radio, the central receiver and control unit (not illustrated) evaluates the respectively received tire data. Subsequently, one or more warning signals are displayed if one of the vehicle tires at the truck trailers has a low pressure. Which of the trailer tires is affected is also indicated. An employee of the fleet can subsequently go in a targeted manner to the respective truck trailer in order to correct the low pressure at the vehicle tire.

It is understood that the foregoing description is that of the preferred embodiments of the invention and that various changes and modifications may be made thereto without departing from the spirit and scope of the invention as defined in the appended claims.

LIST OF REFERENCE NUMERALS

1 Truck trailer
2 Vehicle tire
3 Drone
4 Receiver unit on the drone
5 Transmission of radio-based tire data
6 Central receiver and control unit
7 Base station
8 Parking area for fleet
9 Serpentine-line-shaped flight route of the drone

The invention claimed is:

1. A method for monitoring vehicle tires with a tire pressure control system, wherein the vehicle tires are mounted on a vehicle or on a vehicle trailer and wherein the vehicles or vehicle trailers are in a parked position in a parking area, the method comprising the steps of:
   a) providing a drone having a receiver unit for acquiring radio-based tire data from the tire pressure control system with the drone being stationed at a base station;
   b) lifting off of the drone from the base station and flying along a predefined flight path above the vehicles or the vehicle trailers causing the drone to take into account the transmitter range of the respective tire pressure control systems while flying along the flight path;
   c) receiving tire data from one tire pressure control system or a multiplicity of tire pressure control systems with the receiver unit of the drone;
   d) flying the drone back to the base station;
   e) evaluating the received tire data in a central receiver and control unit and activating a warning signal when a fault diagnosis is made; and,
   f) displaying the warning signal with the central receiver and control unit and issuing an identification specification of the vehicle or of the vehicle trailer with the low tire pressure with the warning signal.

2. The method of claim 1, wherein, in step f), the central receiver and control unit issues a position specification for the vehicle or the vehicle trailer with the low tire pressure with the warning signal.

3. The method of claim 1, wherein the fault diagnosis can relate to a low tire pressure at a vehicle tire, a low battery status or a loose tire module in the vehicle tire.

4. The method of claim 1, wherein the vehicle trailers are truck trailers, and the truck trailers are located in a parking area for a truck trailer fleet.

5. The method of claim 1, wherein, in step f) the central receiver and control unit issues a position specification for the vehicle tire with the low pressure on the truck trailer with the warning signal.

6. The method of claim 1, wherein, in step b) the flight route is made to extend above the truck trailers in a serpentine line.

7. The method of claim 1, wherein, in step b), when flying along the flight path, the drone remains stationary in the air at individual positions for at least 10 seconds in order to be able to reliably receive the tire data from the individual tire pressure control systems.

8. The method of claim 1, wherein, in step b), when flying along the flight path, the drone remains stationary in the air at individual positions for 10 seconds to 3 minutes in order to be able to reliably receive the tire data from the individual tire pressure control systems.

9. The method of claim 1, wherein the tire pressure control system comprises a tire module which is arranged in the tire cavity on the inside of the tire.

* * * * *